(12) United States Patent
Baker

(10) Patent No.: US 6,321,171 B1
(45) Date of Patent: Nov. 20, 2001

(54) ELECTRONIC MEASUREMENT INSTRUMENT PROBE ACCESSORY OFFSET, GAIN, AND LINEARITY CORRECTION METHOD

(75) Inventor: Clifford E. Baker, Hillsboro, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/055,014

(22) Filed: Apr. 3, 1998

(51) Int. Cl.[7] .................................................. G01D 3/024
(52) U.S. Cl. ............................................. 702/104; 702/90
(58) Field of Search ..................... 702/104, 57, 64–66, 702/75–77, 85–88, 90, 91; 324/76.11; 340/870.11

(56) References Cited

U.S. PATENT DOCUMENTS

| | | | |
|---|---|---|---|
| 4,303,984 | 12/1981 | Houvig | 364/571 |
| 4,418,392 | 11/1983 | Hata | 364/571 |
| 4,611,304 | 9/1986 | Butenko et al. | 364/571 |
| 4,845,649 | 7/1989 | Eckardt et al. | 364/571.02 |
| 4,858,615 | 8/1989 | Meinema | 128/668 |
| 4,864,842 | 9/1989 | Regimand | 73/1 R |
| 4,868,476 | 9/1989 | Respaut | 318/632 |
| 5,014,229 | 5/1991 | Mofachern | 364/571.04 |
| 5,089,979 | 2/1992 | McEachern et al. | 364/571.04 |
| 5,125,260 | 6/1992 | Hedeen | 73/10 V |
| 5,247,467 | 9/1993 | Nguyen et al. | 364/571.02 |
| 5,249,143 | 9/1993 | Staley, III | 364/571.01 |
| 5,347,476 | 9/1994 | McBean, Sr. | 364/571.04 |
| 5,361,218 | 11/1994 | Tripp et al. | 364/571.01 |
| 5,365,462 | 11/1994 | McBean, Sr. | 64/571.04 |
| 5,375,073 | 12/1994 | McBean | 364/571.01 |
| 5,377,128 | 12/1994 | McBean | 364/571.04 |
| 5,528,519 | 6/1996 | Ohkura et al. | 364/571.04 |
| 5,734,596 | * 3/1998 | Medelius et al. | 702/107 |
| 5,839,094 | * 11/1998 | French | 702/91 |
| 5,946,641 | * 8/1999 | Morys | 702/91 |

OTHER PUBLICATIONS

Dally et al, Instrumentation for Engineering Measurements. John Wiley & Sons, Inc., pub. 1993 pp 14–20.*

* cited by examiner

Primary Examiner—Marc S. Hoff
Assistant Examiner—Craig Steven Miller
(74) Attorney, Agent, or Firm—Boulden G. Griffith; William K. Bucher

(57) ABSTRACT

A correction method for an electronic instrument accessory probe utilizes an error correction equation wherein at least one term contains an exponent less than unity. One simple such equation is: $S = Cs^2 + Bs + A + b|s|^x$ (where $0 < x < 1$), but additional terms may be added, either with integer exponents greater than 2, or with other fractional exponents less than one. In the most simple embodiment, there are only four coefficients and the only term with a fractional exponent has an exponent of ½ (i.e., $x = 0.5$). A second set of coefficients may be needed for the correction of negative values.

16 Claims, 2 Drawing Sheets

ELECTRONIC MEASUREMENT INSTRUMENT PROBE ACCESSORY OFFSET, GAIN, AND LINEARITY CORRECTION METHOD

FIELD OF THE INVENTION

This invention relates to correcting measurements conducted through a probe or transducer accessory to an electrical measurement instrument, and more particularly to an improved method for correcting for offset, gain, and linearity of such instrument accessories.

CROSS-REFERENCE TO RELATED APPLICATIONS

[Not applicable]

STATEMENT REGARDING FEDERALLY SPONSORED RESEARCH AND DEVELOPMENT

[Not applicable]

BACKGROUND OF THE INVENTION

It has long been known to correct for probe, or transducer, offset and gain errors with linear equations of the form: $S=As+B$, where "S" is the corrected signal, "s" is the uncorrected signal, and A and B are correction coefficients. It has also been known to correct for offset, gain, and linearity errors with a quadratic equation of the form: $S=Cs^2+Ds+E$, where again "S" is the corrected signal, "s" is the raw data signal, and C, D, and E are correction coefficients. It has even been known to correct for offset, gain, linearity, and higher order non-linearities by the use of third order equations: $S=Fs^3+Gs^2+Hs+I$, where again "S" is the corrected signal, "s" is the uncorrected signal, and F, G, H, and I are the correction coefficients.

Such first, second, and third order correction equations, and the coefficients used with them, are fairly successful at reducing overall error in the corrected signal "S", and increasingly so as additional terms of higher order are employed. They are, however, less effective at dealing with "near-zero" errors, particularly when such errors are expressed as a percentage of the measured value. As the measured value approaches zero, any error that remains becomes much larger by comparison with what is being measured.

For example, if the goal is to measure 150 amperes, and the results are subject to an error of +/−1.0 A, the percentage error is only 0.67%. However, if the goal is to measure 50 amps, and the results are subject to an error of +/−0.5 A, the percentage error increases to 1.0%, even though the absolute error is only half as much as it was at 150 A. Further illustrating this problem, if the goal is to measure only 5.0 A, and the absolute error decreases to 0.2 A, the percentage error nonetheless rises to 4%. Thus, it becomes apparent that offset errors, or apparent offset errors, overtake gain and linearity as the source of percentage error as the quantity being measured approaches zero. By "apparent offset" errors, we include those which arise from the "best fit" process by which the calibration coefficients are derived from the errors in uncorrected data.

Typically, electronic measurement instrument vendors must include two components in accuracy specifications, a constant and a percentage of the measurement result. This dictates that guaranteed accuracy is subject to plus or minus errors that are the greater of a constant and a percentage.

What is desired is a way to reduce the "near-zero" or "apparent offset" contribution to residual errors after a correction computation has been performed.

BRIEF SUMMARY OF THE INVENTION

In accordance with the present invention, a method for correcting errors in the offset, gain, and linearity of an accessory transducer for an electronic measurement instrument utilizes an error correction equation wherein at least one of the terms has an exponent of less than one. The correction equation has the general form $S=Cs^2+Bs+A+b|s|^x$, where x, the exponent of s in the any terms to the right of the offset constant, A, is less than one, i.e., $0<x<1$. In a simple, and therefore preferred, embodiment x=0.5.

DETAILED DESCRIPTION OF THE INVENTION

Figure 1:
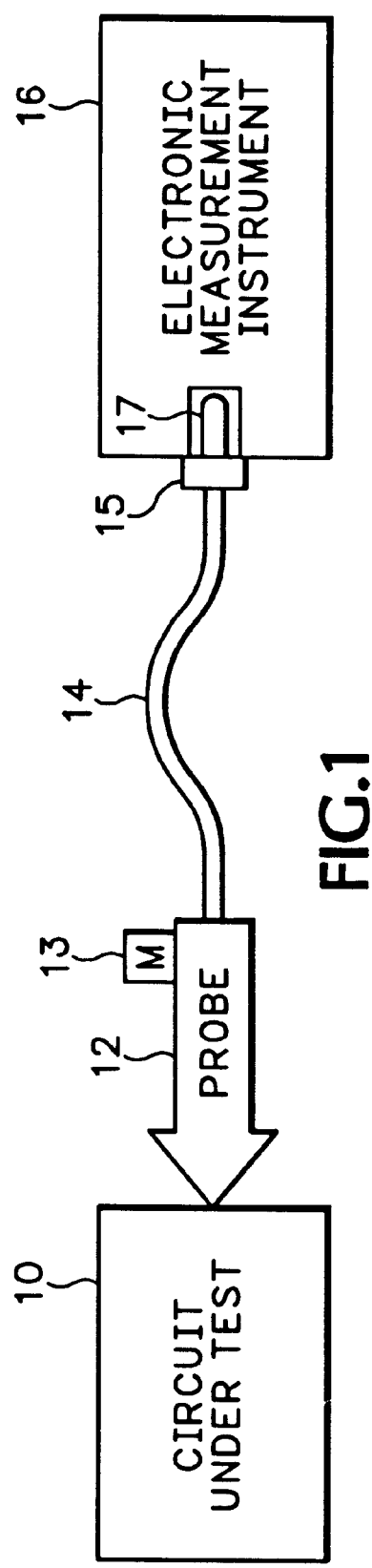
FIG. 1 is a simplified block diagram showing the context within which the method of the present invention is practiced.

Referring first to FIG. 1, a circuit under test 10 is shown being monitored by one or another type of electrical measurement probe or transducer 12. The probe 12 includes a memory unit 13 and a cable 14. The cable 14 is equipped with a plug 15 that mates with a jack 17 of the electronic measurement instrument 16. The memory unit 13 is readable from the instrument 16 and, along with any other information that it might be useful to store there, it contains the coefficients for the error correction equations that are used in the method of the present invention.

Figure 2:
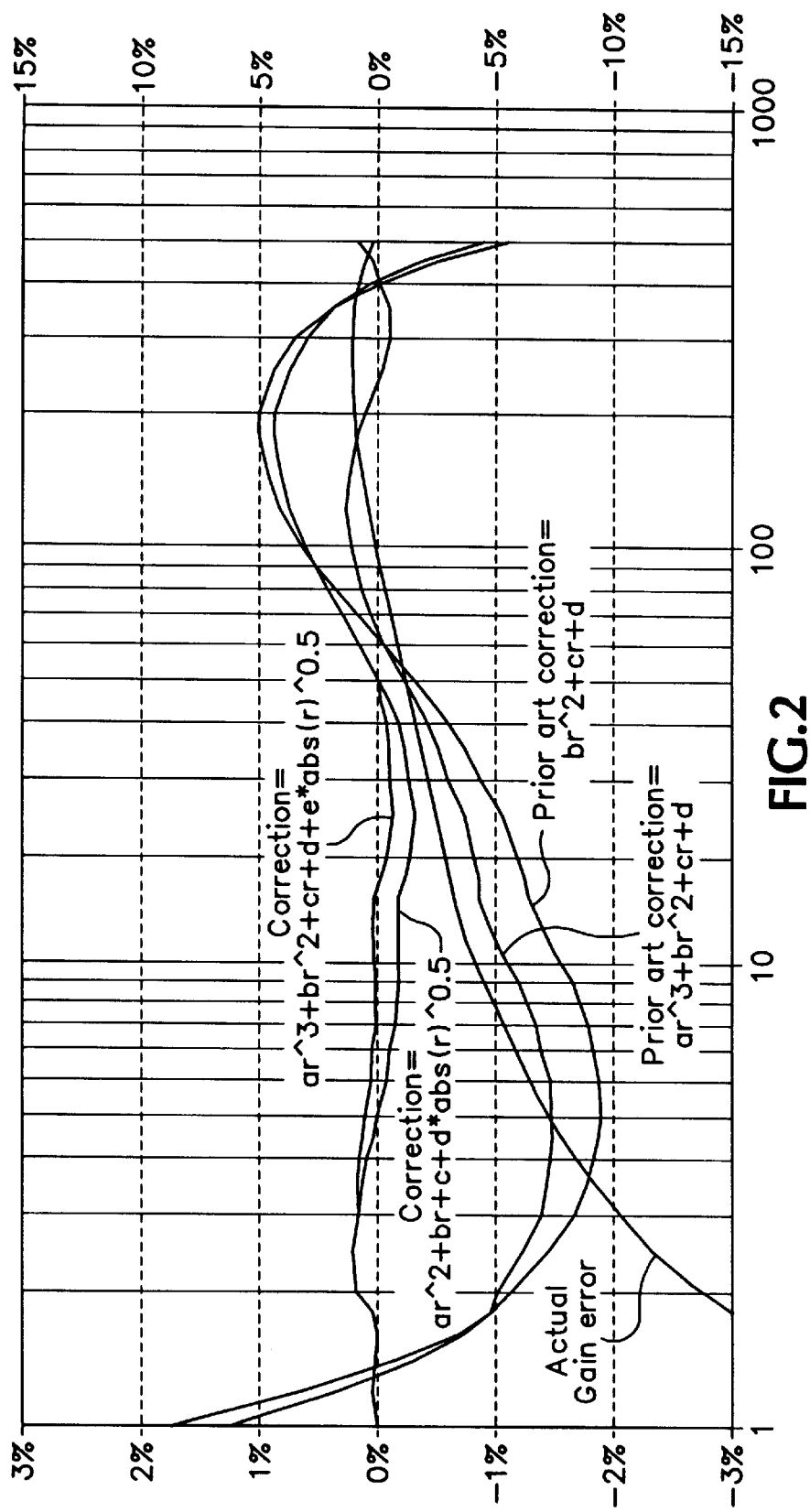
FIG. 2 is a percent age error versus current graph of five sets of error calculations. One is the percentage error in an uncorrected reading, r. The other four are graphs of the percentage of error in corrected readings, R. Two of these corrected readings have been obtained using prior art methods; the other two have been produced in accordance with the method of the present invention.

FIG. 2 is a multiple graph of percentage error versus current for five sets of calculations, one of which is the percentage of error in an uncorrected reading, r (or signal, s), and the others of which are the percentage errors in four corrected readings, R (signal, S). The horizontal axis of the graph is a logarithmic scale from 1 A to 1000 A of current. There are two vertical axes, one on the right and one on the left, with the one on the left indicating error percentages from −3% to +3%, and the one on the right indicating error percentages from −15% to +15%. The scale on the right only applies to the one uncorrected signal, while the scale on the left applies to the four corrected signals.

The use of both R and S, somewhat interchangeably, in this document is meant to indicate that the correction technique described herein is suitable for use with both the "reading" of static quantities, as with a multimeter, and the viewing or analysis of changing "signals", as with an oscilloscope or spectrum analyzer. In both cases, the technique anticipates being used to correct digitized values of an electrical signal. In the case of time varying signals, particularly if they are sampled rapidly and that process creates a large amount of data, it is most likely that the correction process will not be feasible in "real time", but will rather be part of post- acquisition processing activity. It is not intended to be limited to post-processing, however, when the relationship between correction calculation time and acquisition time permits the correction computation to be accomplished as rapidly as the reading or signal is sampled.

Continuing to refer to FIG. 2, a current measuring probe supplies a continuous set of uncorrected readings, r, (or signals, s). The choice of current is quite arbitrary, as the signals or readings could have been any other electrical parameter, such as voltage, impedance, frequency, etc. As the legend indicates, the actual gain error percentage is shown in a dashed and dotted line. The percentage error scale for that line is the one shown at the right, extending from +15% to −15%. As we can see, the actual percentage of error was in excess of −15% below 1.8 A. The actual percentage of error decreased as the measured value when up, becoming about 10% at 3.1 A and less than 5% at about 8 A. The error decreased to near zero around 100 A and stayed less than about +1% for most of the rest of the way to the maximum current value measured, 500 A, by which point it was close to zero percent again.

A dashed line with triangles shows how a correction according to the prior art wag capable of reducing the percentage of error. This is the correction based on a quadratic equation, with one coefficient (b) for an $r^2$ term, another coefficient (c) for an $r^1$ term, and a final coefficient (d) for an $r^0$, or constant, term. The corrected error percentage after adjustment by this equation starts at about 1.8% at 1.0 A, and decreases rather swiftly to become nearly zero at about 1.9 A. It then peaks at less than −2% around 6 A, and goes back below −1% around 38 A. It then crosses zero percent near 65 A and rises to slightly above +1% when the current being read is around 190 A. It then crosses back across zero error at around 400 A and is slightly greater than −1% at the final measured value of 500 A. The error percentages near 1 A, at about 1.8%, and near 6 A, at nearly −2%, were the largest error not eliminated by this correction equation.

A continuous line with squares illustrates bow a correction made by a third order prior art equation performed. This equation, $R=ar^3+br^2+cr+d$, shows error percentages that are a slight to a significant improvement over those for the second order equation. Near 1 A it displays an error of about 1.2% and then crosses zero to a maximum negative error of about −1.5% near 6 A of measured current. It showed the most dramatic improvement over the simple quadratic equation in the region from 60 A to 500 A, exhibiting a maximum error of about 0.2% in this region, contrasting favorably with the performance of the second order prior art equation which rose above 1% in this region.

The first correction equation according to the present invention is shown as a line with asterisk-like identifiers distributed along its length. That line illustrates the residual error that occurs after correction by $R=ar^2+br+c+d|r|^{0.5}$ according to the present inventions Note that the error using this equation is less than 0.1% over most of the region from 1 A to 2 A. It reaches a peak of about −0.3% around 25 A, then crosses zero again and has a maximum positive value of less than 1% near 200 A and is approaching −1% as the measured value reaches 500 A. Note that, while this error correction equation according to the present invention only marginally outperforms the analogous prior art equation above 50 A, below 50 A it outperforms the most similar prior art error correction equation quite dramatically, having a maximum error percentage of about −0.3% instead of the almost 2% produced by the prior art.

The second correction equations according to the present invention is shown as a line with plus-sign-like identifiers distributed long its length. That line illustrates the residual error that occurs after correction by $R=ar^3+br^2+cr+d+e|r|^{0.5}$ according to the present invention. Note that the error using this equation is less than 0.1% over most of the region from 1 A to 2 A, and very close to negligible from 6 A to 13 A. It reaches a peak of about +0.3% around 120 A.

Generally, equations with an extra term containing a fractional power of s (or r) according to the present invention dramatically outperform their prior art counterparts without such a term in the low range of measurement results, from zero to ten. They moderately outperform those counterparts in the mid range of measurement results, from ten to seventy. And, they produce comparable results in the high range, from seventy to five hundred.

As is well known in the art from the production of coefficients for the prior art equations of the second and third order, the coefficients for the improved error correction equations of the method of the present invention can be calculated to a desired level of precision by an iterative process of trial and error calculation, or other algorithms that improve on this basic method. The results of such a process are known as "best fit" coefficients. The inputs required for this process are ideal or theoretical measurements and actual measurement results containing a repeatable pattern of errors (i.e., random errors averaged out). With these two ingredients, actual measurements including a repeatable pattern of errors, and reference theoretical or ideal measurements, the two can be compared to find error data. The coefficients of an error function employing a desired number of terms of a predetermined type can then be found which "best fits" the error data. The inverse of that best fit error function will be the best fit correction function.

The process described immediately above must operate on a bounded range of values. The concept of "best fit" only works for such a bounded range of values. Attempting to use the correction equation beyond this range may lead to wildly erroneous results. Note in FIG. 2 how the slope of some of the percentage error plots indicate that they are heading toward very large values outside of the range for which they were developed.

Also, because the probe or transducer may well have different characteristics in its negative range of outputs than it does in its positive range of outputs, it may well be desirable or necessary to produce two sets of correction equation coefficients, one for use in the positive range and another for use in the negative range.

In general, accuracy is increased by the use of additional terms. Note the improvement in results obtained by the third order prior art equation, as compared with the second order prior art equation. Most of that improvement occurs at the larger values end of the data however. The inclusion of factional exponents according to the present invention produces improvements at the smaller values end of the data. And, again, the more terms the more accurate the overall result. For example, the most accurate correction equation used above in FIG. 2 can be extended in both directions (using a notation for coefficients that is more susceptible to such expansion because the constant coefficient remains the same, i.e., A): . . . $+Er^4+Dr^3+Cr^2+Br+A+b|r|^{0.5}+c|r|^{0.33}+d|r|^{0.25}$ . . . .

However, since the space required to store coefficients data, the computation time required to make the corrections, and, most dramatically, the computation time required to obtain the error correction equation coefficients, all So up with additional terms in the correction equation, there are practical reasons for limiting the number of terms used in such equations. If the probe (or transducer) is only calibrated once in its lifetime, then the third cost listed above may not be a significant factor. However, if the calibration calculations must be repeated frequently in the field, then the time required to compute the error correction coefficients may become a major constraint on how many terms are desirable. The second factor, the computation time required to use the correction equation, becomes very significant if a large amount of data must be processed continuously in order to produce a real-time display.

While a preferred embodiment of the present invention has been shown and described, it will be apparent to those skilled in the art that many changes and modifications may be made without departing from the invention in its broader aspects. For example, the term probe as used herein is meant to embrace a variety devices including types of transducers, as well as amplifiers and attenuators. The claims that follow are therefore intended to cover all such changes and modifications as are permitted by the patent laws of the respective countries in which this patent is granted.

What is claimed is:

1. A method for compensating for offset, gain, and linearity errors in a measured signal, s, sent from an probe accessory to an electronic measurement instrument via a conductive pathway, said probe accessory serving the function of monitoring one or more of electrical parameter such as voltage, current, impedance, or frequency, said measured signal communicating an uncorrected indication of the monitored electrical parameter's values, the method producing an error corrected signal, S, having reduced offset, gain, and linearity errors over a predetermined range of calibrated values, the method comprising the steps of:

calibrating the probe accessory and conductive pathway with respect to a particular one of the electrical parameters to find four or more coefficients for a correction function having the form: $S=Cs^2+Bs+A+b|s|^x$, where $0<x<1$ and further coefficients beyond four are associated with either higher powers of s, such as $Ds^3$, or additional terms with different values of x still satisfying the condition $0<x<1$, such as $c|s|^{x'}$, such that when the correction function is applied to the communicated signal, s, for values within the predetermined range of calibrated values, an enhanced accuracy signal, S, is produced;

monitoring one of the electrical parameters with the probe accessory and communicating the values of the measured signal s over the conductive pathway to the electrical measurement instrument, the values of the measured signal s being within the predetermined range of calibrated values; and applying the correction function using the predetermined four or more coefficients to the values of the measured signal s, thereby producing values of S.

2. A method according to claim 1 wherein the four or more coefficients are only found and applied for positive values of the measured signal s and the predetermined range of calibrated value is entirely composed of positive values, and an additional four or more coefficients are found and applied for negative values of the measured signal s, and a second predetermined range of calibrated values associated with the additional four or more coefficients is entirely composed of negative values.

3. A method according to claim 2 wherein the step of calibrating comprises the steps of:

monitoring a particular one of the electrical parameters and communicating a plurality of positive sample values of the measured signal s over the conductive pathway to the electrical measurement instrument, the positive sample values being distributed over the positive predetermined range of calibrated values;

using calculation and iteration, finding a best fit solution for the value of the four or more coefficients, using the plurality of positive sample values and corresponding ideal expected positive values of the enhanced accuracy signal, S';

monitoring the particular one of the electrical parameters and communicating a plurality of negative sample values of the measured signal s over the conductive pathway to the electrical measurement instrument, the negative sample values being distributed over the negative predetermined range of calibrated values; and using calculation and iteration, finding a best fit solution for the value of the additional four or more coefficients, using the plurality of negative sample values and corresponding ideal expected negative values of the enhanced accuracy signal, S'.

4. A method according to claim 2 wherein the x's in the step of calibrating have the value of 0.5.

5. A method according to claim 2 further comprising the step of storing the four or more coefficients and the additional four or more coefficients in the probe accessory.

6. A method according to claim 5 further comprising the step of:

accessing, from the electrical instrument, the four or more coefficients and the additional four or more coefficients stored in the probe accessory.

7. A method according to claim 2 wherein the electrical measurement instrument is a digital multimeter.

8. A method according to claim 2 wherein the electrical measurement instrument is a digital oscilloscope.

9. A method according to claim 2 wherein the electrical measurement instrument is a spectrum analyzer.

10. A method according to claim 1 wherein the step of calibrating comprises the steps of:

monitoring a particular one of the electrical parameters and communicating a plurality of sample values of the measured signal s over the conductive pathway to the electrical measurement instrument, the sample values being distributed over the predetermined range of calibrated values; and using calculation and iteration, finding a best fit solution for the value of the four or more coefficients, using the plurality of sample values and corresponding ideal expected values of the enhanced accuracy signal, S'.

11. A method according to claim 1 wherein the x in the step of calibrating has the value of 0.5.

12. A method according to claim 1 further comprising the step of:

storing the four or more coefficients in the probe accessory.

13. A method according to claim 12 further comprising the step of:

accessing, from the electrical instrument, the four or more coefficients stored in the probe accessory.

14. A method according to claim 1 wherein the electrical measurement instrument is a digital multimeter.

15. A method according to claim 1 wherein the electrical measurement instrument is a digital oscilloscope.

16. A method according to claim 1 wherein the electrical measurement instrument is a spectrum analyzer.

* * * * *